(12) United States Patent
Konishi et al.

(10) Patent No.: US 10,309,790 B2
(45) Date of Patent: Jun. 4, 2019

(54) AUTOMATIC DRIVING SYSTEM

(71) Applicants: HONDA MOTOR CO., LTD., Tokyo (JP); Alpine Electronics, Inc., Tokyo (JP)

(72) Inventors: Hitoshi Konishi, Wako (JP); Shuichi Suto, Iwaki (JP)

(73) Assignees: HONDA MOTOR CO., LTD., Tokyo (JP); ALPINE ELECTRONICS, INC., Tokyo (JP)

( * ) Notice: Subject to any disclaimer, the term of this patent is extended or adjusted under 35 U.S.C. 154(b) by 122 days.

(21) Appl. No.: 15/335,895

(22) Filed: Oct. 27, 2016

(65) Prior Publication Data
US 2017/0122754 A1 May 4, 2017

(30) Foreign Application Priority Data

Oct. 28, 2015 (JP) .................................. 2015-211798

(51) Int. Cl.
*G05D 1/02* (2006.01)
*B60W 30/18* (2012.01)
(Continued)

(52) U.S. Cl.
CPC ............. *G01C 21/34* (2013.01); *B60W 10/04* (2013.01); *B60W 10/18* (2013.01);
(Continued)

(58) Field of Classification Search
CPC ............... G01C 21/34; G01C 21/3629; B60W 30/18154
See application file for complete search history.

(56) References Cited

U.S. PATENT DOCUMENTS

2013/0041548 A1* 2/2013 Krautter .................. B60R 25/00
701/25
2015/0353085 A1* 12/2015 Lee ........................ B60W 30/10
701/533
2017/0043780 A1* 2/2017 Yoon ............... B60W 30/18163

FOREIGN PATENT DOCUMENTS

JP          2006-266865 A      10/2006
JP          2013-45392 A        3/2013
(Continued)

OTHER PUBLICATIONS

Notification of Reasons for Refusal dated Apr. 3, 2018, issued in counterpart Japanese application No. 2016-210232, with English translation. (6 pages).

(Continued)

*Primary Examiner* — Peter D Nolan
(74) *Attorney, Agent, or Firm* — Westerman, Hattori, Daniels & Adrian, LLP

(57) ABSTRACT

An automatic driving system mounted on a vehicle includes a navigation device that searches for a route from a current position of the vehicle to a destination, a high precision map unit that generates detail information of the route based on the searched route and map information, and an automatic driving control device that performs automatic control of acceleration and deceleration and steering of the vehicle using at least the detail information. The high precision map unit divides the route into a plurality of block regions and, out of the detail information corresponding to the block regions, outputs the detail information currently required for the automatic control to the automatic driving control device in a unit of block region.

29 Claims, 8 Drawing Sheets

(51) Int. Cl.
*G01C 21/34* (2006.01)
*B60W 10/18* (2012.01)
*B60W 10/20* (2006.01)
*B60W 30/12* (2006.01)
*B60W 10/04* (2006.01)
*B60W 10/184* (2012.01)
*G01C 21/36* (2006.01)

(52) U.S. Cl.
CPC .......... *B60W 10/184* (2013.01); *B60W 10/20* (2013.01); *B60W 30/12* (2013.01); *B60W 30/18154* (2013.01); *G05D 1/0278* (2013.01); *B60W 2550/402* (2013.01); *G01C 21/3629* (2013.01)

(56) References Cited

FOREIGN PATENT DOCUMENTS

| JP | 2015-141476 A | | 8/2015 |
|---|---|---|---|
| JP | 2015141476 A | * | 8/2015 |

OTHER PUBLICATIONS

Notification of Reasons for Refusal dated Nov. 13, 2018, issued in counterpart Japanese Application No. 2016-210232, with English machine translation. (5 pages).

* cited by examiner

| ROAD NODE ID | COORDINATE POINT | NUMBER OF CONNECTED ROAD LINKS | CONNECTED ROAD LINK ID |
|---|---|---|---|
| 1A | (X, Z) | 3 | 5a, 8a |
| 2A | *, * | * | *, * |
| 3A | *, * | * | *, * |
| 4A | *, * | * | *, * |
| ... | ... | ... | ... |

| ROAD LINK ID | START POINT ROAD NODE ID | END POINT ROAD NODE ID | WIDTH | NUMBER OF LANES |
|---|---|---|---|---|
| 1a | Y | Xx | 3 m | 2 |
| 2a | * | * | * | * |
| 3a | * | * | * | * |
| 4a | * | * | * | * |
| ... | ... | ... | ... | ... |

| LANE NODE ID | COORDINATE POINT | NUMBER OF CONNECTED LANE LINKS | CONNECTED LANE LINK ID |
|---|---|---|---|
| 1Z | (V, Z) | 3 | 5y, 8y |
| 2Z | *,* | * | *,* |
| 3Z | *,* | * | *,* |
| 4Z | *,* | * | *,* |
| ... | ... | ... | ... |

| LANE LINK ID | START POINT LANE NODE ID | END POINT LANE NODE ID | LANE NUMBER | LANE TYPE | WIDTH | RIGHT SIDE LINE TYPE/ LEFT SIDE LINE TYPE | TRAFFIC INFORMATION | COORDINATE POINT SEQUENCE (X, Z) (*,*) |
|---|---|---|---|---|---|---|---|---|
| 1z | G1 | G2 | 1 | BRANCH | 3 m | BORDER LINE/ WHITE SOLID LINE | NONE | (X, Z) (*,*) |
| 2z | * | * | 2 | * | * | */* | * | *,* |
| 3z | * | * | 3 | * | * | */* | * | *,* |
| 4z | * | * | 4 | * | * | */* | * | *,* |
| ... | ... | ... | ... | ... | ... | ... | ... | ... |

# AUTOMATIC DRIVING SYSTEM

CROSS REFERENCES TO RELATED APPLICATIONS

The present application claims priority under 35 U.S.C. § 119 to Japanese Patent Application No. 2015-211798, filed Oct. 28, 2015, entitled "Automatic Driving System." The contents of this application are incorporated herein by reference in their entirety.

TECHNICAL FIELD

The present disclosure relates to an automatic driving system that includes a route detail information generation device that generates detail information of a route searched by a navigation device and an automatic driving control device that performs automatic control of acceleration and deceleration and steering of a vehicle using the generated detail information.

BACKGROUND

Japanese Unexamined Patent Application Publication No. 2006-266865 discloses a vehicle support technique that identifies a route searched by using a road reference information IR indicating a road map with a lane reference information IL presenting the road map in details and generates guide information for guiding a vehicle based on the route identified with the lane reference information IL.

SUMMARY

When controlling automatic driving of a vehicle actually, an automatic driving control device performs automatic driving control based on detail information of a route identified with lane reference information. For this reason, the detail information of the route has to be output to the automatic driving control device. However, the detail information has huge volume, and the recordable capacity of a storage medium on the automatic driving control device side thus has to be increased. Furthermore, the automatic driving control device has to have an ability to perform calculation processing at a high speed. As a result, the cost of the automatic driving control device is increased. Conversely, decreasing the amount of the detail information output to the automatic driving control device can suppress the cost of the automatic driving control device. However, this may cause restriction on desirable automatic driving control.

One aspect of the present application describes, for example, an automatic driving system that suppresses the cost of an automatic driving control device and enables appropriate automatic driving control.

The present disclosure describes an automatic driving system that is mounted on a vehicle and includes a navigation device that searches for a route from a current position of the vehicle to a destination, a route detail information generation device that generates detail information of the route based on the route searched by the navigation device and map information, and an automatic driving control device that performs automatic control of acceleration and deceleration and steering of the vehicle using at least the detail information. The route detail information generation device divides the route into a plurality of block regions and, out of the detail information corresponding to the block regions, outputs the detail information currently required for the automatic control to the automatic driving control device in a unit of block region.

Accordingly, only the detail information currently required for the automatic driving control is output to the automatic driving control device, whereby the cost of the automatic driving control device can be suppressed while appropriate automatic driving control is performed.

The route detail information generation device may firstly output the detail information of a predetermined number of the block regions to the automatic driving control device, and for the block regions after that, upon determining the vehicle has passed one block region, output the detail information of the next block region to the automatic driving control device. The automatic driving control device may include a detail information storage unit that stores therein the detail information output from the route detail information generation device and, upon determining that the vehicle has passed one block region, delete the detail information of the passed block region from the detail information storage unit. With this, on the automatic driving control device side, the detail information of the predetermined number of the block regions to be run from now is held, whereby appropriate automatic driving control can be performed and the required storage capacity of the detail information storage unit can be suppressed.

The route detail information generation device may cause the predetermined number to be different depending on the type of the detail information. With this, the number of the block regions for the detail information held by the automatic driving control device varies depending on the type of the detail information, whereby only the information currently required for the automatic driving control can be held and the required storage capacity of the detail information storage unit can be suppressed.

The type of the detail information may include at least lane information that indicates a running lane that is runnable by the vehicle from now, lane supplementary information that indicates a content related to a running limit of the running lane that is runnable by the vehicle from now, and feature information corresponding to the running lane that is runnable by the vehicle from now.

The predetermined number depending on the type of the detail information may be the smallest for the feature information. With this, the storage capacity of the detail information storage unit can be suppressed.

The block regions may be obtained by dividing the route by a predetermined distance. With respect to the block region that includes an intersection, the block region may be longer at least than the length of the intersection. With this, automatic driving control at an intersection can be performed appropriately.

The block regions may be obtained by dividing the route by a predetermined distance. The route detail information generation device may cause the predetermined distance to be different depending on the type of the detail information. With this, the distance for the detail information held by the automatic driving control device varies depending on the type, whereby only the information currently required for the automatic driving control can be held and the storage capacity of the detail information storage unit can be suppressed.

The predetermined distance depending on the type of the detail information may be the shortest for the feature information. With this, the required storage capacity of the detail information storage unit can be suppressed.

BRIEF DESCRIPTION OF THE DRAWINGS

The advantages of the disclosure will become apparent in the following description taken in conjunction with the following drawings.

FIG. 2 is a diagram illustrating an example of a road node table stored in a navigation map storage unit illustrated in FIG. 1.

FIG. 3 is a diagram illustrating an example of a road link table stored in a navigation map storage unit illustrated in FIG. 1.

FIG. 4 is a diagram illustrating an example of a lane node table stored in the high precision map storage unit illustrated in FIG. 1.

FIG. 5 is a diagram illustrating an example of a lane link table stored in the high precision map storage unit illustrated in FIG. 1.

DETAILED DESCRIPTION

An automatic driving system according to the present disclosure will be described below in details by giving a preferred embodiment and with reference to the appended drawings.

Figure 1:
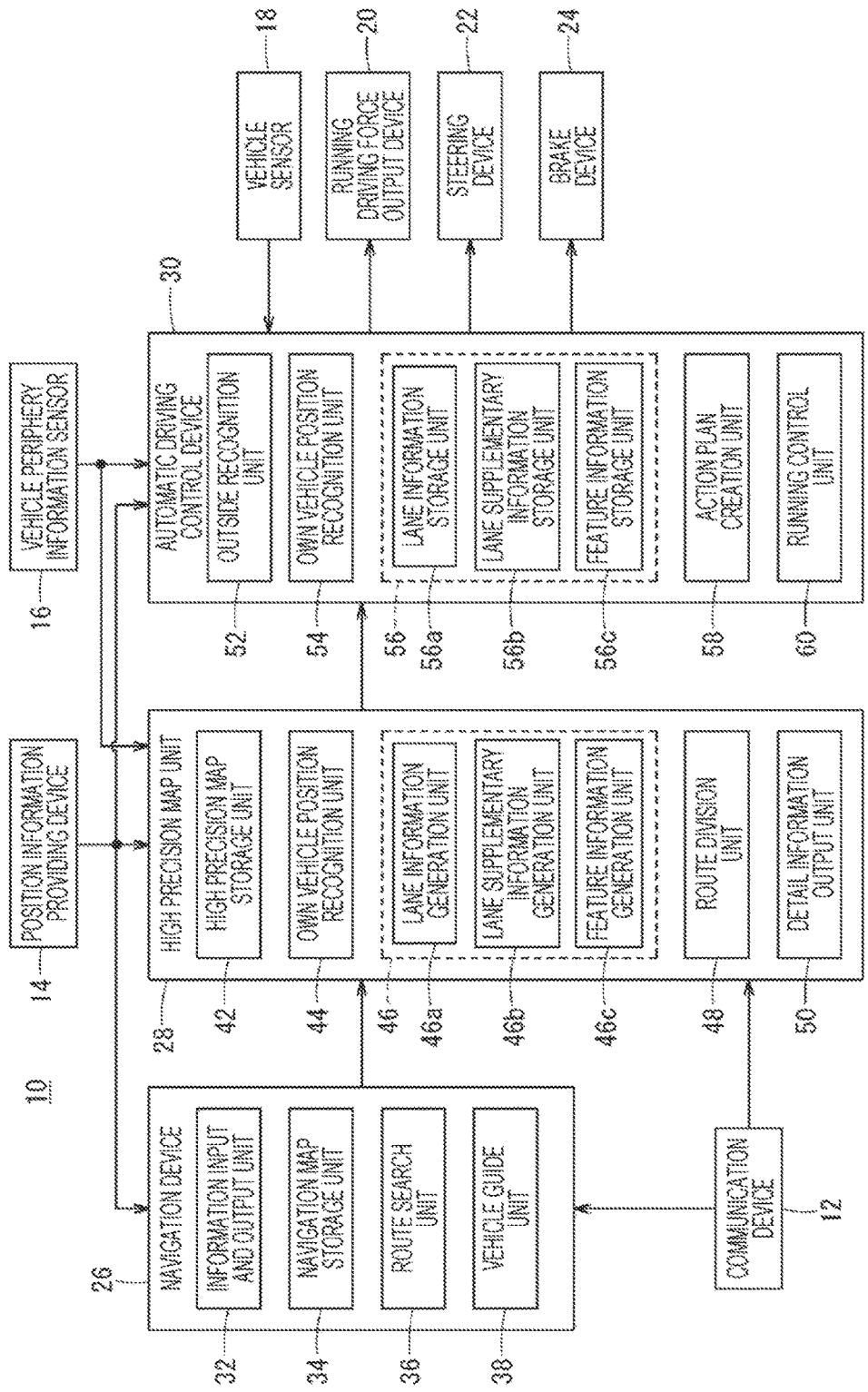
FIG. 1 is an overview configuration diagram of an automatic driving system mounted on a vehicle according to an embodiment.

FIG. 1 is an overview configuration diagram of an embodiment of an automatic driving system 10 mounted on a vehicle. The automatic driving system 10 includes a communication device 12, a position information providing device 14, a vehicle periphery information sensor 16, a vehicle sensor 18, a running driving force output device 20, a steering device 22, a brake device 24, a navigation device 26, a high precision map unit 28, and an automatic driving control device 30. Each of the navigation device 26, the high precision map unit 28, and the automatic driving control device 30 includes a computer and a recording medium storing therein a program. One or a plurality of the computers execute a plurality of the programs, thereby functioning as the navigation device 26, the high precision map unit 28, and the automatic driving control device 30 according to the present embodiment. Those functions may be implemented by hardware such as circuitry.

The communication device 12 communicates with a server which is not illustrated via the Internet and acquires map information, traffic information, and the like from the server. The communication device 12 outputs the received map information and traffic information to the navigation device 26 and the high precision map unit 28. The position information providing device 14 receives a positioning signal from a plurality of satellites composing a Global Navigation Satellite System (GNSS) and identifies a position of a vehicle with the automatic driving system 10 mounted thereon (hereinafter, referred to as an own vehicle in some cases). The GNSS is, for example, a positioning system such as GPS, GLONSS, and Galileo. The position information providing device 14 outputs the identified position of the own vehicle to the navigation device 26, the high precision map unit 28, and the automatic driving control device 30.

The vehicle periphery information sensor 16 detects periphery information of the own vehicle. The vehicle periphery information sensor 16 detects an object (a preceding vehicle, a lane border line, a pedestrian, a bicycle, a following vehicle, and others) present on the periphery of the own vehicle. The vehicle periphery information sensor 16, for example, includes at least one of a Light Detection and Ranging or Laser Imaging Detection and Ranging (LIDAR) that measures a scattered light with respect to an irradiation light and measures a distance to an object on the periphery of the own vehicle, a camera that images the periphery of the own vehicle, and a radar device that irradiates an electromagnetic wave and detects a reflection light thereof to recognize an object on the periphery of the own vehicle. The LIDAR is disposed, for example, in a head lamp section, in a tail lamp section, or in the vicinity of a roof of the vehicle. The camera is disposed, for example, on the upper side of a windshield or the rear side of a sideview mirror. The radar device is disposed, for example, in the vicinity of a bumper or a front grill. The vehicle periphery information sensor 16 outputs the detected periphery information of the own vehicle to the high precision map unit 28 and the automatic driving control device 30.

The vehicle sensor 18 detects a running state of the vehicle and includes at least one of a triaxial acceleration sensor, a vehicle speed sensor, and a yaw rate sensor, for example. The vehicle sensor 18 outputs the detected running state of the vehicle to the automatic driving control device 30.

The running driving force output device 20 includes at least one of an engine or a traction motor. When the running driving force output device 20 includes only an engine, the running driving force output device 20 drives and controls a throttle opening of the engine, a fuel injection device that injects fuel, and an ignition plug that makes ignition, for example, thereby driving the engine to generate a running driving force required for the vehicle to run. Furthermore, when the running driving force output device 20 includes only a traction motor, the running driving force output device 20 adjusts a duty ratio of a PWM signal given to an inverter and drives the traction motor, thereby generating a running driving force required for the vehicle to run. When the running driving force output device 20 includes both an engine and a traction motor, the running driving force output device 20 drives and controls the engine and the traction motor. The running driving force output device 20 generates a running driving force in accordance with the control of the automatic driving control device 30. It should be noted that when the running driving force output device 20 includes an automatic transmission, the automatic driving control device 30 controls shifting gears of the automatic transmission as well.

The steering device 22 drives and controls an electric motor of an electric power steering. With this electric motor driven, a steering shaft of the vehicle is rotated. With this, the vehicle is steered. The steering device 22 may include a steering angle sensor that detects a steering angle for this (the rotation angle of the steering). A detection signal of this steering angle sensor is output to the automatic driving control device 30. The steering device 22 adjusts the steering angle in accordance with the control of the automatic driving control device 30. The brake device 24 drives and controls an electric actuator for giving a braking force to wheels of the vehicle. The brake device 24 adjusts the braking force given to the wheels in accordance with the control of the automatic driving control device 30.

The navigation device 26 includes an information input and output unit 32, a navigation map storage unit 34, a route search unit 36, and a vehicle guide unit 38. The information input and output unit 32 is, for example, a touch panel type display unit composed by superimposition of a liquid crystal display (LCD), an organic electro luminescence (EL), or the like and a position input unit capable of detecting a touch position by an operator with a coordinate detection mechanism. The driver can input a destination and the like by operating the information input and output unit 32. Furthermore, the information input and output unit 32 includes a speaker that outputs a speech sound, an alarm sound, and the like to the driver or other persons.

The navigation map storage unit 34 is a recording medium in which map information for navigation (hereinafter, navigation map information) is recorded. This navigation map information includes a road layer. The road layer includes a road node table 34a (see FIG. 2), a road link table 34b (see FIG. 3), a point of interest (POI; spot information of a target such as a main facility (a coordinate point)), information of the POI, a link cost, and the like. Various facilities for a POI are, for example, a signal, a traffic sign, a signboard, and a building. The information of the POI includes details of a traffic sign and the names of a signal and a building. The link cost is information that indicates a running route with the shortest distance and a recommended running route, for example, from one spot to another spot. The navigation map information stores therein version information thereof in an associated manner, and the version information is updated together at the time of the update of the navigation map information. The update of the navigation map information is performed via the communication device 12. More specifically, the communication device 12 transmits the version information of the navigation map information stored in the navigation map storage unit 34 to the server, and the server then calculates difference map information (information that indicates a changed point in the map) between the latest navigation map information and the navigation map information stored in the navigation map storage unit 34. The server then transmits the difference map information to the communication device 12. With this, the navigation map information stored in the navigation map storage unit 34 is updated by the difference map information.

FIG. 2 is a diagram illustrating an example of the road node table 34a. The road node table 34a is a list of information that specifies a road node serving as a reference point on a road reference line along a road. The road reference line is, for example, the center line of the road. The road node table 34a stores therein, with respect to a plurality of road node IDs, coordinate points (for example, coordinate points that can identify road node IDs such as longitudes and latitudes), the number of road links that are connected (number of connected road links), and IDs of road links that are connected (connected road link IDs) in an associated manner.

FIG. 3 is a diagram illustrating an example of the road link table 34b. The road link table 34b is a list of information that indicates a section form of a road between a plurality of road nodes. The road link table 34b stores therein, with respect to a plurality of road link IDs, road node IDs connected as start points of road links (start point road node IDs), road node IDs connected as end points of road links (end point road node IDs), the widths of the roads, and the number of lanes in an associated manner.

FIG. 1 will now be explained again. The route search unit 36 refers to the navigation map information stored in the navigation map storage unit 34 while searching a route from a current position of the own vehicle to the destination input by an operator or other person operating the information input and output unit 32. The route search unit 36 uses information of the current position of the own vehicle identified by the position information providing device 14 to search a route. The route search unit 36 may search a route for the own vehicle to run in addition to traffic information such as congestion information and traffic regulation information acquired by the communication device 12. Search of a route may be complemented by information from an external device with which the communication device 12 communicates. The route search unit 36 transmits (outputs) the searched route information to the high precision map unit 28.

The vehicle guide unit 38, based on the searched route, outputs information for presenting the route and the required time to the destination and, when a toll (for example, a highway toll) is caused, the amount thereof, for example, by an image or a speech sound to the information input and output unit 32. The information input and output unit 32 receives this to display the route and the required time to the destination and the toll, and also guides the route for the own vehicle to run by a speech sound.

The high precision map unit (route detail information generation device) 28 includes a high precision map storage unit 42, an own vehicle position recognition unit 44, a detail information generation unit 46, a route division unit 48, and a detail information output unit 50. The high precision map storage unit 42 is a recording medium in which map information with high precision (hereinafter, high precision map information) is recorded. This high precision map information is map information that is more precise and detailed than the navigation map information. The high precision map information includes a lane layer, a feature table, and a road lane corresponding table. The high precision map information stores therein version information thereof in an associated manner, and the version information is updated together at the time of the update of the high precision map information. The update of the high precision map information is performed via the communication device 12. More specifically, the communication device 12 transmits the version information of the high precision map information stored in the high precision map storage unit 42 to the server, and the server then calculates difference map information (information that indicates a changed point in the map) between the latest high precision map information and the high precision map information stored in the high precision map storage unit 42. The server then transmits the difference map information to the communication device 12. With this, the high precision map information stored in the high precision map storage unit 42 is updated by the difference map information.

The lane layer includes a lane node table 42a (see FIG. 4) and a lane link table 42b (see FIG. 5). FIG. 4 is a diagram illustrating an example of the lane node table 42a. The lane node table 42a is a list of information that specifies a lane node serving as a reference point on a lane reference line. The lane reference line is, for example, the center line of the lane. The lane node table 42a stores therein, with respect to a plurality of lane node IDs, coordinate points (for example, coordinate points that can identify lane node IDs such as longitudes and latitudes), the number of lane links that are connected (number of connected lane links), and IDs of lane links that are connected (connected lane link IDs) in an associated manner.

FIG. 5 is a diagram illustrating an example of a lane link table 42b. The lane link table 42b is a list of information that indicates a section form of a lane between a plurality of lane nodes. The lane link table 42b stores therein, with respect to a plurality of lane link IDs, lane node IDs connected as start points of lane links (start point lane node IDs), lane node IDs connected as end points of lane links (end point lane node IDs), lane numbers each of which indicates the order of the lane counted from the left when facing in the traveling direction of the vehicle, lane types (for example, branch lane or passing lane), the widths of the lanes, line types (right side line type, left side line type) of border lines (for example, lane marks) of the lanes at the left side and the right side when facing in the traveling direction of the vehicle, traffic information for the lanes, and coordinate point sequences each of which indicates the shape of a lane reference line of a lane section indicated by a lane link (for example, a plurality of coordinate points formed of longitudes and latitudes) in an associated manner. Furthermore, the lane link table 42b may store therein information for depicting the shapes of the lanes (for example, a curvature) when the shapes of the lanes are peculiar. It should be noted that the traffic information of the lane link table 42b also stores therein traffic information acquired via the communication device 12. The traffic information for the lane link table 42b is updated continually and periodically (at a fixed time interval), and the latest traffic information acquired by the communication device 12 is thus stored in the lane link table 42b.

The feature table is a list of information that indicates a feature present on or in the vicinity of a lane. The feature is, for example, a traffic sign, a signal, a stop line, a zebra zone, a road border line, a building, a signboard, and a telegraph pole. This feature table stores therein, with respect to a plurality of feature IDs, coordinate points on which features are present (for example, coordinate points such as longitudes and latitudes), the names of buildings, and lane node IDs or lane link IDs of lanes on which features are present in an associated manner.

The road lane corresponding table is a list of information that indicates a lane node corresponding to a road node. For example, in the road lane corresponding table, a lane node ID corresponding to a road node ID is stored. It should be noted that the road lane corresponding table may be a list of information that indicates a lane node or a lane link corresponding to a road node. In this case, in the road lane corresponding table, a lane node ID and a lane link ID corresponding to a road node ID are stored. Furthermore, the road lane corresponding table may further store therein a list of information that indicates a lane link corresponding to a road link. In this case, in the road lane corresponding table, a lane link ID corresponding to a road link ID is further stored.

FIG. 1 will now be explained again. The own vehicle position recognition unit 44 uses high precision map information, the current position of the own vehicle identified by the position information providing device 14, and the periphery information of the own vehicle (information of an object on the periphery of the vehicle) detected by the vehicle periphery information sensor 16 to recognize the position of the own vehicle (running position) with high precision. For example, the own vehicle position recognition unit 44 corrects the current position of the own vehicle identified by the position information providing device 14 based on a feature such as a building, a signboard, a traffic sign, and a signal detected by the vehicle periphery information sensor 16 and feature information included in the high precision map information. For example, in a case where although a feature (for example, assumed to be a building) A is supposed to be present 5 m ahead based on the current position of the own vehicle identified by the position information providing device 14, the building A is 10 m ahead based on a detection result from the vehicle periphery information sensor 16, the current position of the own vehicle identified by the position information providing device 14 and the actual current position of the own vehicle are to be different. The own vehicle position recognition unit 44 thus corrects the current position of the own vehicle identified by the position information providing device 14 based on the detection result from the vehicle periphery information sensor 16 to recognize the current position of the own vehicle with high precision. For this operation, the own vehicle position recognition unit 44 includes an object recognition processing unit that recognizes an object based on an image captured by the camera, for example. Furthermore, the own vehicle position recognition unit 44 may recognize a position in the width direction of the running lane of the own vehicle based on the position of the lane border line (for example, lane mark) detected (imaged) by the vehicle periphery information sensor 16 (for example, the camera). More specifically, the own vehicle position recognition unit 44 recognizes whether the own vehicle is running in the middle, running closer to the left side, or running closer to the right side of the lane. Furthermore, the own vehicle position recognition unit 44 may recognize an angle formed by the running direction of the own vehicle with the running lane. This angle also can be obtained by detecting the lane border line.

The detail information generation unit 46 generates the detail information of the route based on the high precision map information and the route information transmitted from the navigation device 26. The detail information generation unit 46 generates the detail information for each type. The types of the detail information include lane information, lane supplementary information, and feature information.

The detail information generation unit 46 includes a lane information generation unit 46a, a lane supplementary information generation unit 46b, and a feature information generation unit 46c. The lane information generation unit 46a generates the lane information that indicates a lane for running (running lane) that the own vehicle may run from now based on the high precision map information and the route information transmitted from the navigation device 26, and stores therein the generated lane information. This lane information is information that indicates the running lane along the route searched by the navigation device 26. The lane information generation unit 46a may generate a plurality of pieces of lane information along the route searched by the navigation device 26. For example, the lane information generation unit 46a may generate lane information that indicates a recommended running lane (recommended lane information) and lane information that indicates a running lane that is runnable (runnable lane information). This lane information includes information that indicates the order of the lane counted from the left when facing in the traveling direction of the vehicle and information that indicates the width.

The lane supplementary information generation unit 46b generates the lane supplementary information that indicates a content related to a running limit of the running lane based on the lane information, based on the high precision map information and the lane information generated by the lane information generation unit 46*a*, and stores therein the generated lane supplementary information. The lane supplementary information includes, for example, information that indicates a speed limit (maximum speed) for the running lane, information that indicates a lane change prohibited section, information that indicates traffic regulation (for example, no entry and men at work), information that indicates temporary stop, and information that indicates presence or absence of a signal. This lane supplementary information also includes position information (coordinate points such as longitudes and latitudes). Based on these coordinate points, the position or the section on the running lane to which the content related to a running limit belongs can be recognized. The information that indicates a speed limit (maximum speed), the information that indicates a lane change prohibited section, and the information that indicates traffic regulation can be seen in traffic information in the lane link table 42*b* (see FIG. 5). Furthermore, the information that indicates temporary stop and the information that indicates presence or absence of a signal can be seen in information of a stop line and a signal in the feature table. When the lane information generation unit 46*a* has generated a plurality of pieces of lane information, the lane supplementary information generation unit 46*b* may generate the lane supplementary information for each piece of the lane information (for example, for each of the recommended lane information and the runnable lane information).

The feature information generation unit 46*c* generates feature information corresponding to the running lane based on the lane information, based on the high precision map information and the lane information generated by the lane information generation unit 46*a*. The feature information includes, for example, a traffic sign, a signal, a stop line, a zebra zone, a road border line, a building, a signboard, and a telegraph pole, and is the information stored in the feature table. This feature information also includes position information (coordinate points such as longitudes and latitudes). Based on these coordinate points, the position of a feature on the running lane can be recognized. When the lane information generation unit 46*a* has generated a plurality of pieces of lane information, the feature information generation unit 46*c* may generate the feature information for each piece of the lane information (for example, for each of the recommended lane information and the runnable lane information).

Figure 6:
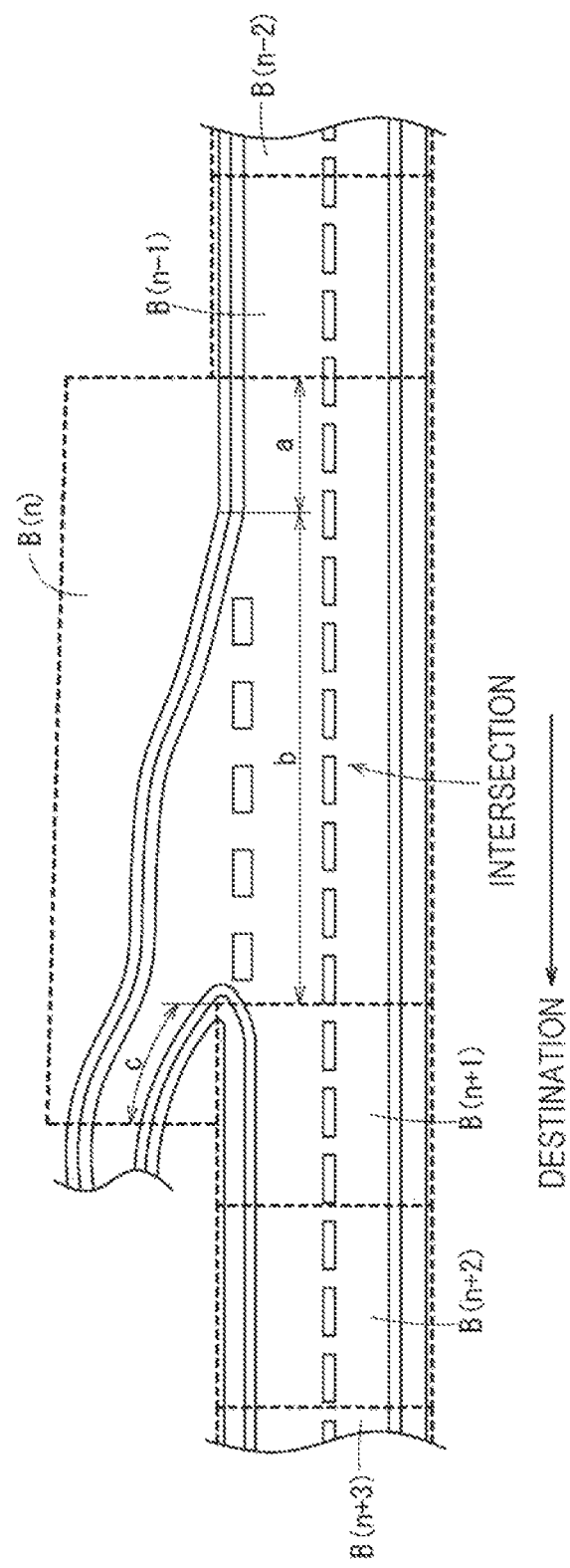
FIG. 6 is a diagram explaining division of a route in the vicinity of an intersection.

The route division unit 48 divides the route (running route) searched by the navigation device 26 (the route search unit 36) into a plurality of block regions B. In principle, these block regions B are obtained by dividing the route by a predetermined distance (for example, a fixed distance such as 100 m). The length of the block region B in the traveling direction of the vehicle thus becomes a predetermined distance. The route division unit 48 divides the route from a departure point of the route toward a destination. The route division unit 48 divides the block region B that includes an intersection (including roads and lanes that are branched or joining such as a junction and a branch point) such that the length of the running direction of the block region B becomes longer at least than the length of the intersection. With reference to FIG. 6, the division of the route at an intersection will be described in detail.

As illustrated in FIG. 6, when the route is divided evenly by a predetermined distance from the departure point of the route to make block regions B(n−2), B(n−1), for example, a block region B that is next to the block region B(n−1) has to be separated in the middle of the intersection. It is not desirable that an intersection is formed by a plurality of block regions B in view of automatic driving control, which will be described later, and thus, the route is divided such that the block region B(n) that is next to the block region B(n−1) covers the entire length of the intersection in the direction of the route. More specifically, the route is divided such that the block region B(n) covers a distance a from the end of the block region B(n−1) to the intersection and a length b of the intersection along the direction of the route. This distance a is assumed to be shorter than the predetermined distance. This is because, when the distance a is longer than the predetermined distance, the end of the block region B next to the block region B(n−1) is positioned before the intersection and the intersection is not separated in the middle thereof. Furthermore, with respect to a lane that is branched at the intersection and extends in a direction that is not the direction of the route, the route is divided such that the block region B(n) that covers this intersection includes an area covering a fixed distance b from the end point of the intersection. Furthermore, a part of the route after the block region B(n) is divided normally by the predetermined distance to make block regions B(n+1), B(n+2), . . . .

The detail information output unit 50 outputs (transmits) the detail information of the block region B currently required for the automatic driving control out of the detail information (the lane information, the lane supplementary information, and the feature information) corresponding to a plurality of block regions B divided by the route division unit 48 to the automatic driving control device 30 in a unit of block region B. The detail information output unit 50 outputs the detail information related to the block regions B sequentially from the departure point side in a unit of block region. This output operation will be described in detail later.

The automatic driving control device 30 includes an outside recognition unit 52, an own vehicle position recognition unit 54, a detail information storage unit 56, an action plan creation unit 58, and a running control unit 60. The outside recognition unit 52 recognizes an object positioned on the periphery of the vehicle, a position of the object, and a state of the object based on a detection result from the vehicle periphery information sensor 16. An object includes, in addition to a peripheral vehicle (for example, a preceding vehicle and a following vehicle), a traffic sign, a signal, a stop line, a zebra zone, a road border line, a building, a signboard, and a telegraph pole. Furthermore, when the object is a peripheral vehicle, for example, the "state of the object" includes a running speed of the peripheral vehicle and whether the peripheral vehicle is changing lanes or trying to change lanes. When the object is a signal, a color state of the signal (red, blue, yellow, and the like) is also included in the "state of the object". Furthermore, when the object is a pedestrian, a bicycle, or the like, the "state of the object" also includes the speed, the traveling direction, and the like of the pedestrian or the bicycle.

The own vehicle position recognition unit 54 uses the feature information (detail information) stored in the feature information storage unit 56*c* described later, the current position of the own vehicle identified by the position information providing device 14, and the periphery information of the vehicle (information of an object on the periphery of the vehicle) detected by the vehicle periphery information sensor 16 to recognize the position (running position) of the own vehicle with high precision. For example, the own vehicle position recognition unit 54 corrects the current position of the own vehicle identified by the position information providing device 14 based on a feature such as a building, a signboard, a traffic sign, and a signal detected by the vehicle periphery information sensor 16 and the feature information stored in the feature information storage unit 56c. This own vehicle position recognition unit 54 has a function equivalent to that of the own vehicle position recognition unit 44 of the high precision map unit 28, and thus the explanation thereof will be omitted.

The detail information storage unit 56 stores therein the detail information transmitted from the high precision map unit 28 (the detail information output unit 50). The detail information storage unit 56 stores therein each of a plurality of types of detail information individually. The detail information storage unit 56 includes a lane information storage unit 56a, a lane supplementary information storage unit 56b, and a feature information storage unit 56c. The lane information storage unit 56a stores therein the lane information transmitted from the high precision map unit 28 (the detail information output unit 50). The lane supplementary information storage unit 56b stores therein the lane supplementary information transmitted from the high precision map unit 28 (the detail information output unit 50). The feature information storage unit 56c stores therein the feature information transmitted from the high precision map unit 28 (the detail information output unit 50). A storage operation performed by the detail information storage unit 56 will be described in detail later.

The action plan creation unit 58 creates an action plan for performing automatic driving (for controlling automatic running of the own vehicle). The action plan creation unit 58 creates an action plan based on the running state of the vehicle detected by the vehicle sensor 18, the object positioned on the periphery of the vehicle, the position of the object, and the state of the object recognized by the outside recognition unit 52, the current position (running position) of the own vehicle recognized by the own vehicle position recognition unit 54, and the lane information, the lane supplementary information, and the feature information stored in the detail information storage unit 56.

The action plan creation unit 58 decides a running lane on which the own vehicle runs among a plurality of running lanes (recommended running lane, runnable running lane) based on various information such as a state of a preceding vehicle, traffic information, and a state of a pedestrian, and creates an action plan for deciding deceleration and acceleration. Specifically, the action plan is formed of a plurality of events that are sequentially executed. The events include, for example, a deceleration event for causing the own vehicle to decelerate, an acceleration event for causing the own vehicle to accelerate, a stop event for stopping the own vehicle, a lane change event for changing lanes, a passing event for causing the own vehicle to pass a preceding vehicle, and a lane keep event for causing the own vehicle to keep a running lane so as not to deviate from the lane.

The running control unit 60 controls a control target based on the position of the own vehicle recognized by the own vehicle position recognition unit 54 and the action plan created by the running control unit 60. Specifically, the running control unit 60 controls at least one of the running driving force output device 20, the steering device 22, and the brake device 24 in accordance with the position of the own vehicle recognized by the own vehicle position recognition unit 54 and the action plan created by the action plan creation unit 58. With this, at least one of the acceleration and deceleration, and steering of the own vehicle is automatically controlled. The running control unit 60 controls a control target in accordance with the event included in the action plan. For example, when the event is lane change, the running control unit 60 refers to the information that indicates the width included in the lane information to decide the control amount (for example, a torque) of an electric motor in the steering device 22, the control amount (for example, a throttle opening, a fuel injection amount, and an ignition timing) of an engine of the running driving force output device 20, or the control amount (for example, a duty ratio of a PWM signal) of the traction motor. The running control unit 60 outputs information that indicates the control amount decided for each event to the corresponding control target. The control target is then driven in accordance with the information that indicates the control amount output by the running control unit 60. With this, automatic running of the own vehicle can be controlled.

Figure 7:
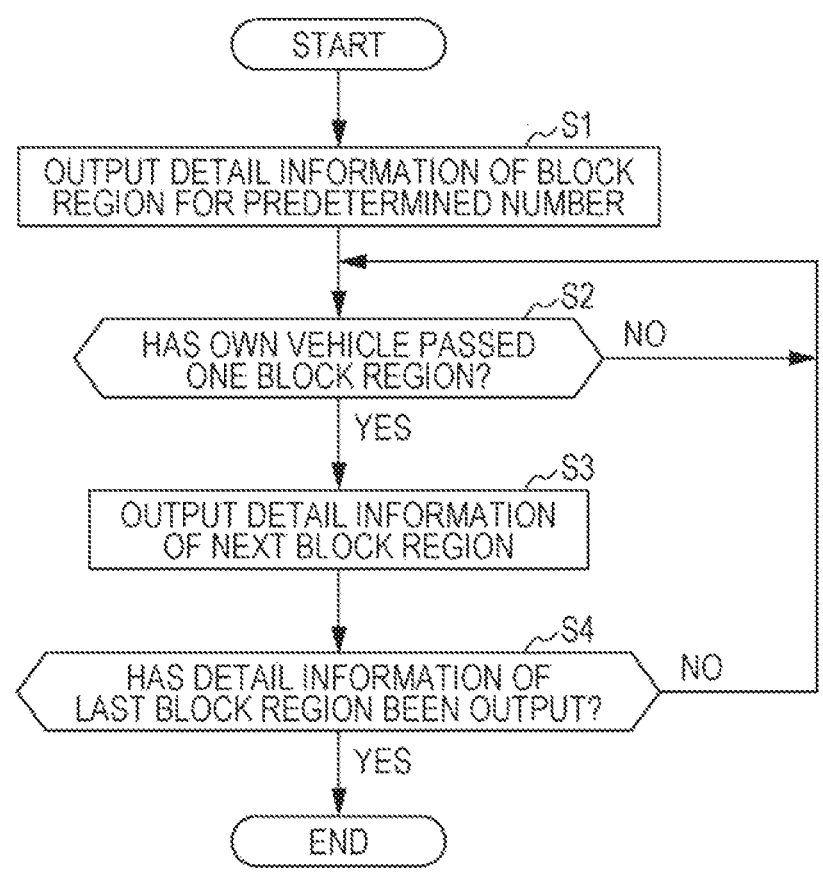
FIG. 7 is a flowchart illustrating an output operation of detail information of a detail information output unit illustrated in FIG. 1.

Next, an output (transmission) operation of the detail information to the automatic driving control device 30 of the high precision map unit 28 (the detail information output unit 50) will be described. FIG. 7 is a flowchart illustrating an output operation of detail information of the detail information output unit 50. When the route is searched by the navigation device 26, the detail information is generated by the detail information generation unit 46, and the route is divided by the route division unit 48, the detail information output unit 50 starts the operation illustrated in FIG. 7.

Firstly, the detail information output unit 50 reads out the detail information (the lane information, the lane supplementary information, and the feature information) corresponding to a predetermined number of block regions B from the departure point of the route from the detail information generation unit 46 and outputs the read detail information to the automatic driving control device 30 (step S1). At this time, the detail information output unit 50 may change this predetermined number for each type of the detail information to output the detail information. For example, with respect to the lane information and the lane supplementary information, the predetermined number is set to 7, and the lane information and the lane supplementary information for 7 block regions B are output. Furthermore, with respect to the feature information, the predetermined number is set to 3, and the feature information for 3 block regions B is output. Each of the lane information and the lane supplementary information is information the most necessary for running. For this reason, when an action plan is created, information for ahead to some extent is required. The feature information is collated with the detection result from the vehicle periphery information sensor 16 to be used for recognition of a position of the own vehicle and recognition of a state of an object positioned on the periphery of the vehicle, and the like. For this reason, compared with the lane information and the lane supplementary information, the feature information comparatively far from the own vehicle is not necessary. The predetermined numbers for the lane information and the lane supplementary information thus are set larger than that for the feature information. It should be noted that the predetermined number for the lane information and that for the lane supplementary information may be different.

Next, at step S2, the detail information output unit 50 determines whether the own vehicle has passed one block region B. This determination is made based on the position of the own vehicle recognized by the own vehicle position recognition unit 44. Basically, the length of one block region B is a predetermined distance, and when the own vehicle has run a predetermined distance, it is determined that the own vehicle has passed one block region B. However, the block region B including an intersection is longer than the predetermined distance. For this reason, when the own vehicle is running the block region B including an intersection, it is determined that the own vehicle has passed one block region B at a time point when the own vehicle has passed the block region B including an intersection.

At step S2, when it is determined that the own vehicle has not passed one block region B, the processing remains at step S2 until the own vehicle passes one block region B. By contrast, when it is determined that the own vehicle has passed one block region B at step S2, the detail information output unit 50 reads out the detail information (the lane information, the lane supplementary information, and the feature information) corresponding to the next block region B (one block region B) from the detail information generation unit 46 and outputs the read detail information to the automatic driving control device 30 (step S3).

Next, at step S4, the detail information output unit 50 determines whether the detail information corresponding to the last block region B, that is, the block region B including the destination has been output. At step S4, when it is determined that the detail information corresponding to the last block region B has not been output, the processing returns to step S2 and the above-described operation is repeated. By contrast, when it is determined that the detail information corresponding to the last block region B has been output at step S4, the detail information output unit 50 ends the operation.

Figure 8:
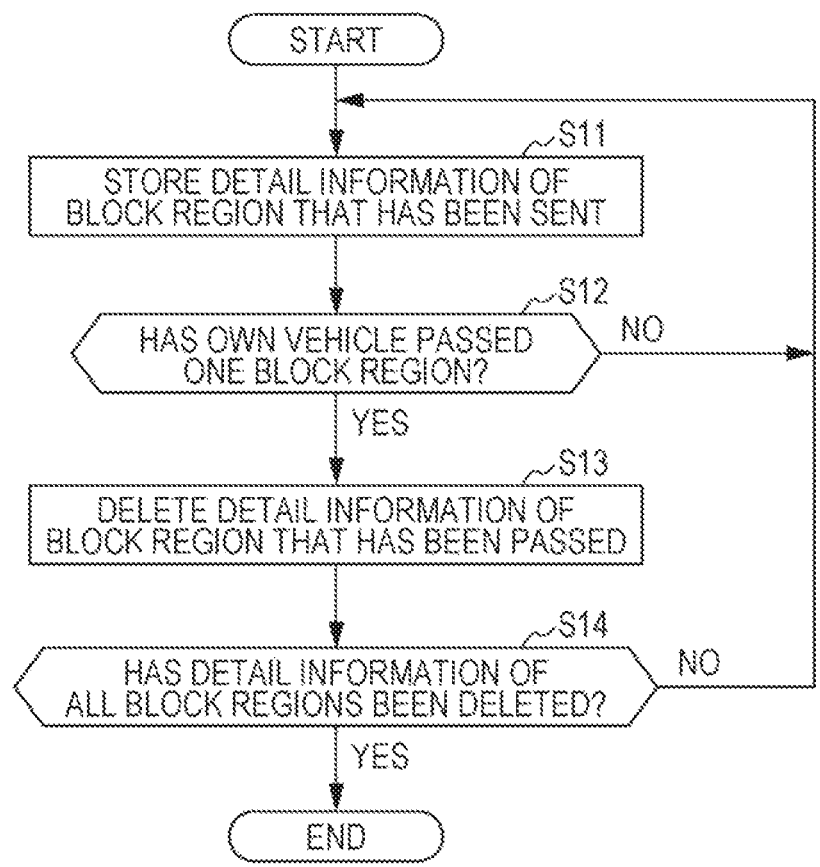
FIG. 8 is a flowchart illustrating a storage operation of detail information of a detail information storage unit illustrated in FIG. 1.

Next, the storage operation of the detail information performed by the automatic driving control device 30 (the detail information storage unit 56) will be described. FIG. 8 is a flowchart illustrating a storage operation of detail information of the detail information storage unit 56. When the route is searched by the navigation device 26, the detail information output unit 50 starts the operation illustrated in FIG. 8.

Firstly, when receiving the detail information corresponding to the block region B from the detail information output unit 50, the detail information storage unit 56 stores therein the received detail information (step S11). The detail information storage unit 56 stores therein the detail information for each type of the detail information. Specifically, the lane information storage unit 56a stores therein the lane information, the lane supplementary information storage unit 56b stores therein the lane supplementary information, and the feature information storage unit 56c stores therein the feature information. When no detail information is received, the operation at step S11 is skipped.

Next, at step S12, the detail information storage unit 56 determines whether the own vehicle has passed one block region B. This determination is made based on the position of the own vehicle recognized by the own vehicle position recognition unit 54. Basically, the length of one block region B is a predetermined distance, and when the own vehicle has run a predetermined distance, it is determined that the own vehicle has passed one block region B. However, the block region B including an intersection is longer than the predetermined distance. For this reason, when the own vehicle is running the block region B including an intersection, it is determined that the own vehicle has passed one block region B at a time point when the own vehicle has passed the block region B including an intersection.

At step S12, when it is determined that the own vehicle has not passed one block region B, the processing returns to step S11 and the above-described operation is repeated. By contrast, when it is determined that the own vehicle has passed one block region B, the detail information storage unit 56 deletes the detail information corresponding to the passed block region B (step S13).

Next, at step S14, the detail information storage unit 56 stores therein the detail information corresponding to all block regions and determines whether the stored detail information has been deleted. At step S14, when it is determined that all the detail information is stored and the stored detail information has not been deleted, the processing returns to step S11 and the above-described operation is repeated. By contrast, when it is determined that all the detail information is stored and the stored detail information has been deleted at step S14, the detail information storage unit 56 ends the operation.

As described above, the high precision map unit 28 firstly outputs the detail information of a predetermined number of block regions B from the departure point of the route to the automatic driving control device 30. The automatic driving control device 30 then stores therein the detail information of these predetermined number of block regions B. Thereafter, when the own vehicle automatically runs to pass one block region B, the high precision map unit 28 outputs the detail information of the next block region B (one block region B) to the automatic driving control device 30. When it is determined that the own vehicle has passed one block region B, the automatic driving control device 30 deletes the detail information of the passed block region B (one block region B) and stores therein the detail information of the next block region B (one block region B) received from the high precision map unit 28. The automatic driving control device 30 thus stores therein the detail information for a predetermined number ahead (in some cases, a predetermined number±1), at the maximum, from the current position (running position) of the own vehicle, and does not store therein the detail information of the block regions B after that or the detail information of the passed block regions B. With this, the storage capacity of the detail information storage unit 56 of the automatic driving control device 30 can be suppressed. Furthermore, because the predetermined number varies depending on the type of the detail information (the lane information, the lane supplementary information, and the feature information), the automatic driving control device 30 may hold only the detail information required for running, whereby the storage capacity of the detail information storage unit 56 can be suppressed.

As described above, the automatic driving system 10, which is mounted on a vehicle, according to the present embodiment includes the navigation device 26 that searches for a route from a current position of the vehicle to a destination, the high precision map unit 28 that generates detail information of the route based on the route searched by the navigation device 26 and map information, and the automatic driving control device 30 that performs automatic control of acceleration and deceleration and steering of the vehicle using at least the detail information. Furthermore, the high precision map unit 28 divides the route into a plurality of block regions B and, out of the detail information corresponding to the block regions B, outputs only the detail information of the block region B currently required for the automatic driving control to the automatic driving control device 30 in a unit of block region B. With this, only the detail information currently required for the automatic driving control is output to the automatic driving control device 30, whereby the automatic driving control device 30 does not have to store therein all the detail information for the route. With this configuration, the cost of the automatic driving control device 30 can be suppressed while appropriate automatic driving control is performed.

The high precision map unit 28 firstly outputs the detail information of a predetermined number of block regions B to the automatic driving control device 30. For the block regions after that, when it is determined that the own vehicle has passed one block region B, the high precision map unit 28 outputs the detail information of the next block region B to the automatic driving control device 30. Meanwhile, the automatic driving control device 30 includes the detail information storage unit 56 that stores therein the detail information output from the high precision map unit 28 and, when it is determined that the own vehicle has passed one block region B, deletes the detail information of the passed block region B from the detail information storage unit 56. With this, on the automatic driving control device 30 side, the detail information of the predetermined number of the block regions B to be run from now is held, whereby appropriate automatic driving control can be performed and the storage capacity of the detail information storage unit 56 can be suppressed.

The high precision map unit 28 may cause the predetermined number to be different depending on the type of the detail information. With this, the number of the block regions B in the detail information held by the automatic driving control device 30 varies depending on the type, whereby only the information currently required for the automatic driving control can be held while the storage capacity of the detail information storage unit 56 is suppressed. The type of the detail information includes at least the lane information that indicates a running lane that is runnable by the vehicle from now, the lane supplementary information that indicates a content related to a running limit of the running lane that is runnable by the vehicle from now, and the feature information corresponding to the running lane that is runnable by the vehicle from now.

The predetermined number depending on the type of the detail information is the smallest with the feature information. With this, the storage capacity of the detail information storage unit 56 can be suppressed.

The block regions B are obtained by dividing the route by a predetermined distance. With respect to the block region B that includes an intersection, the block region B is longer at least than the length of the intersection. With this, automatic driving control at the intersection can be performed more appropriately. When an intersection is formed of a plurality of block regions B, the detail information for the intersection is also divided. Because an intersection, unlike other roads or lanes, has lanes that are branched or joining, there is a possibility that the automatic driving control therefor is complicated due to turning to the right, turning to the left, deceleration, lane change, and the like. According to the present embodiment, because the detail information is transmitted in a unit of block region B, dividing an intersection by a plurality of block regions B may disable quick correspondence to such a complicated automatic driving control. For this reason, according to the present embodiment, a block region B that includes an intersection is set longer at least than the length of the intersection.

According to the present embodiment, the navigation device 26 and the high precision map unit 28 are formed to be separate units. However, the navigation device 26 and the high precision map unit 28 may be formed by one computer. Furthermore, two types of map information, that is, map information of the navigation device 26 (navigation map information) and map information of the high precision map unit 28 (high precision map information) are used in the present embodiment. However, only one type of map information may be used. In this case, the navigation device 26 searches for a route using the high precision map information, and the navigation map information is to be unnecessary. Furthermore, one type of map information obtained by addition of the navigation map information and the high precision map information may be created so that the navigation device 26 and the high precision map unit 28 use this map information obtained by the addition.

Furthermore, according to the above-described embodiment, regardless of the type of the detail information, the same block regions B are used. However, the block regions B may be different depending on the type of the detail information. For example, in the lane information and the lane supplementary information, in principle, a plurality of block regions B are obtained by dividing the route by a first predetermined distance (for example, a fixed distance of 200 m). In the feature information, in principle, a plurality of block regions B are obtained by dividing the route by a second predetermined distance (for example, a fixed distance of 100 m), which is shorter than the first predetermined distance. In this case, the "predetermined number" at step S1 illustrated in FIG. 7 may be the same number regardless of the type of the detail information. Even in this case, the distance in the detail information held by the automatic driving control device 30 may be different depending on the type of the detail information, and the same effects can be achieved as in the above-described embodiment. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An automatic driving system mounted on a vehicle, the automatic driving system comprising:
   a navigation device that searches for a route from a current position of the vehicle to a destination;
   a route detail information generation device that generates detail information of the route by using the route searched by the navigation device and map information; and
   an automatic driving control device that performs automatic control of acceleration and deceleration and steering of the vehicle using the detail information,
   wherein the route detail information generation device divides the route into a plurality of block regions and, out of the detail information corresponding to the block regions, outputs the detail information currently required for the automatic control to the automatic driving control device, the route detail information generation device outputs the detail information in a unit of block region,
   wherein the route detail information generation device firstly outputs the detail information corresponding to a predetermined number of the block regions to the automatic driving control device, and for the block regions after that, upon determining the vehicle has passed one block region, outputs the detail information corresponding to the next block region to the automatic driving control device, and
   the automatic driving control device includes a detail information storage unit that stores therein the detail information output from the route detail information generation device and, upon determining that the vehicle has passed one block region, deletes the detail information of the passed block region from the detail information storage unit.

2. The automatic driving system according to claim 1, wherein the route detail information generation device causes the predetermined number to be different depending on a type of the detail information.

3. The automatic driving system according to claim 2, wherein the type of the detail information includes lane information that indicates a running lane that is runnable by the vehicle from now, lane supplementary information that indicates a content related to a running limit of the running lane that is runnable by the vehicle from a current position, and feature information corresponding to the running lane that is runnable by the vehicle from now.

4. The automatic driving system according to claim 3, wherein the predetermined number depending on the type of the detail information is the smallest for the feature information among the lane information, the lane supplementary information and the feature information.

5. The automatic driving system according to claim 3, wherein the feature information is information regarding one or more fixtures on or around the running lane.

6. The automatic driving system according to claim 2, wherein the detail information includes different types of information.

7. The automatic driving system according to claim 1, wherein the route detail information generation device firstly outputs the detail information corresponding to the predetermined number of the block regions which are first block regions in the route.

8. The automatic driving system according to claim 1, further comprising a vehicle periphery information sensor configured to detect periphery information of the vehicle, wherein the automatic driving control device generates an action plan of the vehicle by using the detail information and the periphery information, and performs automatic control of acceleration and deceleration and steering of the vehicle based on the action plan.

9. An automatic driving system mounted on a vehicle, the automatic driving system comprising:
a navigation device that searches for a route from a current position of the vehicle to a destination;
a route detail information generation device that generates detail information of the route by using the route searched by the navigation device and map information; and
an automatic driving control device that performs automatic control of acceleration and deceleration and steering of the vehicle using the detail information,
wherein the route detail information generation device divides the route into a plurality of block regions and, out of the detail information corresponding to the block regions, outputs the detail information currently required for the automatic control to the automatic driving control device, the route detail information generation device outputs the detail information in a unit of block region,
wherein the block regions are obtained by dividing the route by a predetermined distance and, with respect to the block region that includes an intersection, the block region is made longer than the length of the intersection.

10. The automatic driving system according to claim 9, wherein the block regions are obtained by dividing the route by a predetermined distance, and
the route detail information generation device causes the predetermined distance to be different depending on the type of the detail information.

11. The automatic driving system according to claim 9, wherein, with respect to the block region that includes the intersection, the block region is made longer than the length of the intersection such that the block region of the intersection covers entirety of the intersection.

12. The automatic driving system according to claim 9, further comprising a vehicle periphery information sensor configured to detect periphery information of the vehicle,
wherein the automatic driving control device generates an action plan of the vehicle by using the detail information and the periphery information, and performs automatic control of acceleration and deceleration and steering of the vehicle based on the action plan.

13. An automatic driving system mounted on a vehicle, the automatic driving system comprising:
a navigation device that searches for a route from a current position of the vehicle to a destination;
a route detail information generation device that generates detail information of the route by using the route searched by the navigation device and map information; and
an automatic driving control device that performs automatic control of acceleration and deceleration and steering of the vehicle using the detail information,
wherein the route detail information generation device divides the route into a plurality of block regions and, out of the detail information corresponding to the block regions, outputs the detail information currently required for the automatic control to the automatic driving control device, the route detail information generation device outputs the detail information in a unit of block region,
wherein the block regions are obtained by dividing the route by a predetermined distance, and
the route detail information generation device causes the predetermined distance to be different depending on the type of the detail information,
wherein the type of the detail information includes lane information that indicates a running lane that is runnable by the vehicle from now, lane supplementary information that indicates a content related to a running limit of the running lane that is runnable by the vehicle from a current position, and feature information corresponding to the running lane that is runnable by the vehicle from now.

14. The automatic driving system according to claim 13 wherein the predetermined distance depending on the type of the detail information is the shortest for the feature information among the lane information, the lane supplementary information and the feature information.

15. The automatic driving system according to claim 13, wherein, with respect to the block region that includes an intersection, the block region is made longer than the length of the intersection.

16. The automatic driving system according to claim 13, further comprising a vehicle periphery information sensor configured to detect periphery information of the vehicle,
wherein the automatic driving control device generates an action plan of the vehicle by using the detail information and the periphery information, and performs automatic control of acceleration and deceleration and steering of the vehicle based on the action plan.

17. The automatic driving method according to claim 13, further comprising (iv) detecting periphery information of the vehicle by using a vehicle periphery information sensor,
wherein the step (iii) generates, by the controller, an action plan of the vehicle by using the detail information and the periphery information, and performs automatic control of acceleration and deceleration and steering of the vehicle based on the action plan.

18. An automatic driving method of a vehicle, comprising steps of:
(i) searching for a route from a current position of the vehicle to a destination;
(ii) generating, by using a computer, detail information of the route by using the route searched by the step (i) and map information; and
(iii) performing, by a controller, automatic control of acceleration and deceleration and steering of the vehicle using the detail information,
wherein the step (ii) comprises dividing the route into a plurality of block regions and, out of the detail information corresponding to the block regions, outputting the detail information currently required for the automatic control to the controller, the detail information is output in a unit of block region,
wherein the step (ii) firstly outputs the detail information corresponding to a predetermined number of the block regions to the controller, and for the block regions after that, upon determining the vehicle has passed one block region, outputs the detail information corresponding to the next block region to the controller, and
the controller includes a detail information storage unit that stores therein the detail information output from the step (ii) and, upon determining that the vehicle has passed one block region, deletes the detail information of the passed block region from the detail information storage unit.

19. The automatic driving method according to claim 18, wherein the step (ii) causes the predetermined number to be different depending on a type of the detail information.

20. The automatic driving method according to claim 19, wherein the type of the detail information includes lane information that indicates a running lane that is runnable by the vehicle from now, lane supplementary information that indicates a content related to a running limit of the running lane that is runnable by the vehicle from a current position, and feature information corresponding to the running lane that is runnable by the vehicle from now.

21. The automatic driving method according to claim 20, wherein the predetermined number depending on the type of the detail information is the smallest for the feature information among the lane information, the lane supplementary information and the feature information.

22. The automatic driving method according to claim 20, wherein the feature information is information regarding one or more fixtures on or around the running lane.

23. The automatic driving method according to claim 19, wherein the detail information includes different types of information.

24. The automatic driving method according to claim 18, wherein the step (ii) firstly outputs the detail information corresponding to the predetermined number of the block regions which are first block regions in the route.

25. An automatic driving apparatus mounted on a vehicle, comprising:
a navigation device that searches for a route from a current position of the vehicle to a destination;
a route detail information generation controller that generates detail information of the route by using the route searched by the navigation device and map information; and
an automatic driving controller that performs automatic control of acceleration and deceleration and steering of the vehicle using the detail information,
wherein the route detail information generation controller divides the route into a plurality of block regions and, out of the detail information corresponding to the block regions, outputs the detail information currently required for the automatic control to the automatic driving controller, the route detail information generation controller outputs the detail information in a unit of block region,
wherein the route detail information generation controller firstly outputs the detail information corresponding to a predetermined number of the block regions to the automatic driving controller, and for the block regions after that, upon determining the vehicle has passed one block region, outputs the detail information corresponding to the next block region to the automatic driving controller, and
the automatic driving controller includes a detail information storage device that stores therein the detail information output from the route detail information generation controller and, upon determining that the vehicle has passed one block region, deletes the detail information of the passed block region from the detail information storage device.

26. The automatic driving apparatus according to claim 25, further comprising a vehicle periphery information sensor configured to detect periphery information of the vehicle,
wherein the automatic driving controller generates an action plan of the vehicle by using the detail information and the periphery information, and performs automatic control of acceleration and deceleration and steering of the vehicle based on the action plan.

27. An automatic driving method of a vehicle, comprising steps of:
(i) searching for a route from a current position of the vehicle to a destination;
(ii) generating, by using a computer, detail information of the route by using the route searched by the step (i) and map information; and
(iii) performing, by a controller, automatic control of acceleration and deceleration and steering of the vehicle using the detail information,
wherein the step (ii) comprises dividing the route into a plurality of block regions and, out of the detail information corresponding to the block regions, outputting the detail information currently required for the automatic control to the controller, the detail information is output in a unit of block region, and
wherein the block regions are obtained by dividing the route by a predetermined distance and, with respect to the block region that includes an intersection, the block region is made longer than the length of the intersection.

28. An automatic driving method of a vehicle, comprising steps of:

(i) searching for a route from a current position of the vehicle to a destination;
(ii) generating, by using a computer, detail information of the route by using the route searched by the step (i) and map information; and
(iii) performing, by a controller, automatic control of acceleration and deceleration and steering of the vehicle using the detail information,
wherein the step (ii) comprises dividing the route into a plurality of block regions and, out of the detail information corresponding to the block regions, outputting the detail information currently required for the automatic control to the controller, the detail information is output in a unit of block region, and
wherein the block regions are obtained by dividing the route by a predetermined distance, and
the step (ii) causes the predetermined distance to be different depending on the type of the detail information,
wherein the type of the detail information includes lane information that indicates a running lane that is runnable by the vehicle from now, lane supplementary information that indicates a content related to a running limit of the running lane that is runnable by the vehicle from a current position, and feature information corresponding to the running lane that is runnable by the vehicle from now.

29. An automatic driving system mounted on a vehicle, the automatic driving system comprising:
   a navigation device that searches for a route from a current position of the vehicle to a destination;
   a route detail information generation device that generates detail information of the route by using the route searched by the navigation device and map information; and
   an automatic driving control device that performs automatic control of acceleration and deceleration and steering of the vehicle using the detail information,
   wherein the route detail information generation device divides the route into a plurality of block regions and, out of the detail information corresponding to the block regions, outputs the detail information currently required for the automatic control to the automatic driving control device, the route detail information generation device outputs the detail information in a unit of block region,
   wherein the block regions are obtained by dividing the route by a predetermined distance, and
   the route detail information generation device causes the predetermined distance to be different depending on the type of the detail information,
   wherein, with respect to the block region that includes an intersection, the block region is made longer than the length of the intersection.

* * * * *